United States Patent
Tokoro

(10) Patent No.: US 8,736,768 B2
(45) Date of Patent: May 27, 2014

(54) VIDEO CONTROL APPARATUS AND CONTROL METHOD THEREOF

(75) Inventor: Takashi Tokoro, Sagamihara (JP)

(73) Assignee: Canon Kabushiki Kaisha, Tokyo (JP)

( * ) Notice: Subject to any disclaimer, the term of this patent is extended or adjusted under 35 U.S.C. 154(b) by 481 days.

(21) Appl. No.: 12/409,601

(22) Filed: Mar. 24, 2009

(65) Prior Publication Data

US 2009/0251606 A1 Oct. 8, 2009

(30) Foreign Application Priority Data

Apr. 2, 2008 (JP) ................................. 2008-096558

(51) Int. Cl.
*H04N 5/268* (2006.01)
*H04N 5/44* (2006.01)

(52) U.S. Cl.
USPC .......................................... 348/706; 348/725

(58) Field of Classification Search
None
See application file for complete search history.

(56) References Cited

U.S. PATENT DOCUMENTS

| | | | | |
|---|---|---|---|---|
| 2007/0036158 | A1* | 2/2007 | Hun-Kwon et al. | 370/389 |
| 2007/0055876 | A1* | 3/2007 | Choi | 713/170 |
| 2007/0057931 | A1 | 3/2007 | Takamori | |
| 2008/0165289 | A1* | 7/2008 | Furutani | 348/725 |

FOREIGN PATENT DOCUMENTS

| | | |
|---|---|---|
| JP | 2007-078980 | 3/2007 |
| JP | 2009-003882 A | 1/2009 |

OTHER PUBLICATIONS

HDMI Specification 1.3a, Nov. 2006.*
Hihg Bandwidth Digital Content Protection System, Revision 1.1, Jun. 9, 2003.*
The above reference was cited in a Dec. 7, 2012 Japanese Office Action, which is enclosed without English Translation, that issued in Japanese Patent Application No. 2008-096558.

* cited by examiner

*Primary Examiner* — Jefferey Harold
*Assistant Examiner* — Michael Teitelbaum
(74) *Attorney, Agent, or Firm* — Cowan, Liebowitz & Latman, P.C.

(57) ABSTRACT

Upon reception of a DDC access request from an external device connected to an HDMI port, a television receiver sets an electric potential of an HPD signal to ON level. Upon reception of an HDCP authentication initiation request from the external storage device after EDID is transmitted in response to a request from the external device, it is checked if an HDMI port to which that external device is connected is selected from a plurality of HDMI ports. If it is determined that the corresponding port is not selected, the control waits for selection of an HDMI port to which the external device is connected. If the corresponding port is selected, an electric potential of HPD signal is set at OFF level. After an elapse of 100 msec, the electric potential of the HPD signal is resumed to the ON level.

14 Claims, 8 Drawing Sheets

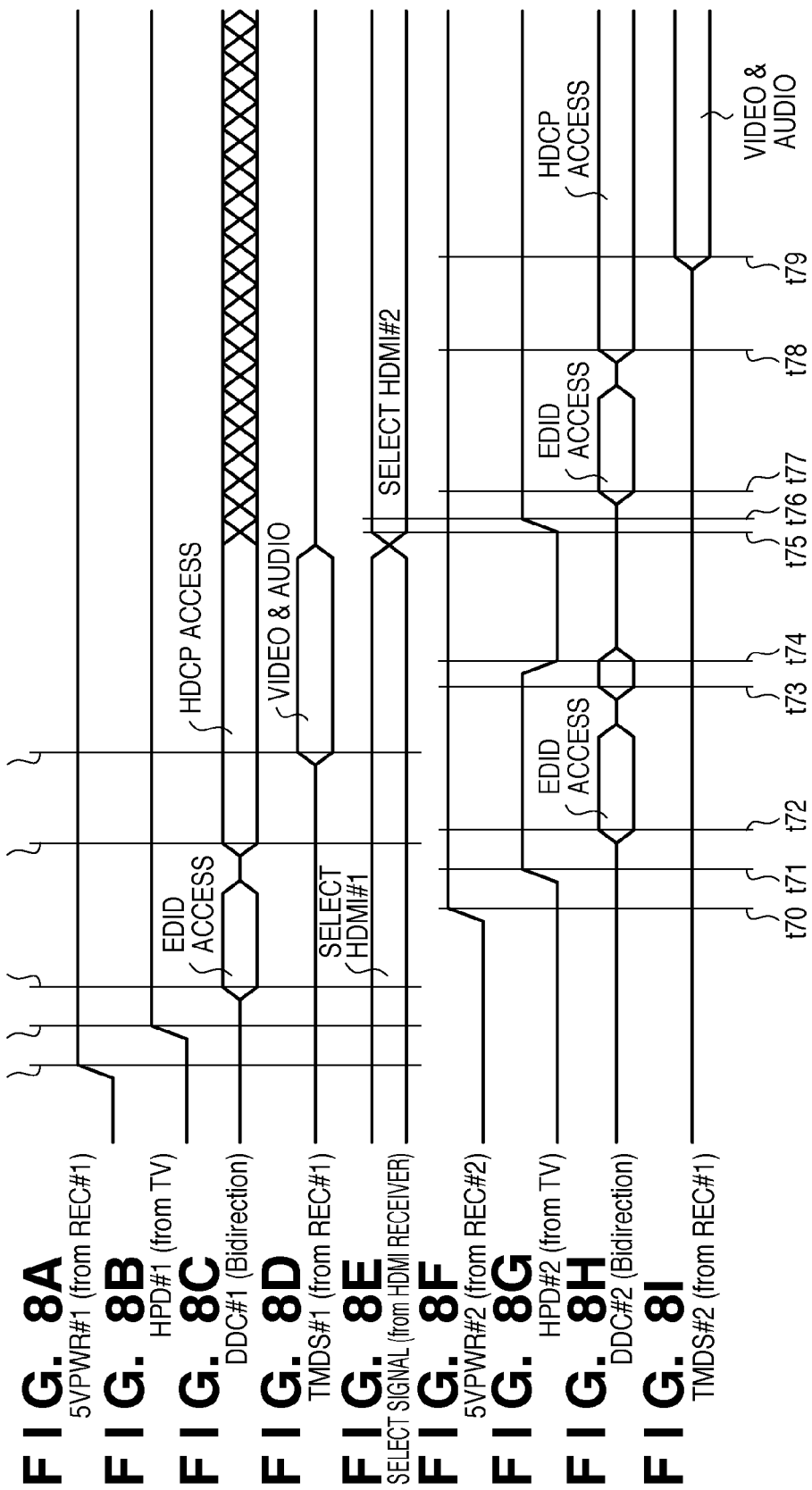

VIDEO CONTROL APPARATUS AND CONTROL METHOD THEREOF

BACKGROUND OF THE INVENTION

1. Field of the Invention

The present invention relates to a video control apparatus and video control method and, more particularly, to a video control apparatus having a plurality of connection terminals to which external devices for transmitting video and audio data are connected, and a control method thereof.

2. Description of the Related Art

In recent years, in order to receive a high-resolution video signal from an external device such as a hard disk recorder to a television receiver, an interface called HDMI (High-Definition Multimedia Interface) is used.

The HDMI can transmit video and audio data via a single cable, and is advantageously free from any troublesome need to connect a plurality of cables. For this reason, the number of HDMI ports for HDMI connections equipped on a video control apparatus is increasing year by year.

The HDMI performs information transmission between connected devices using a TMDS (Transition Minimized Differential Signaling) channel, CEC (Consumer Electronics Control) channel, and DDC (Display Data Channel). The TMDS channel is used to transmit video data, audio data, and auxiliary data.

The CEC channel is used to transmit device control signals. Using a communication of the CEC channel (to be referred to as a CEC communication hereinafter), a video control apparatus and an external device, which are connected via the HDMI, can be cooperatively controlled from a single remote control in place of their individual remote controls. For example, functions of turning off the power supply of the external device in cooperation with power-OFF of the video control apparatus, and switching the input of the video control apparatus in cooperation with start of playback of the external device can be implemented.

In the HDMI, EDID (Extended Display Identification Data) is transmitted by the DDC, and HDCP (High-bandwidth Digital Content Protection) authentication is performed.

Using the EDID, various kinds of information such as information associated with the video control apparatus and a source physical address (to be referred to as a physical address hereinafter) are transmitted. The physical address indicates the device connected to that HDMI port. That is, using the EDID, external devices can be notified of the resolutions and audio stream information supported by the video control apparatus, the loudspeaker information of the video control apparatus, and the physical address of the video control apparatus to be acquired by the external device.

According to HDCP, video and audio data transmitted from the external device to the video control apparatus are encrypted using a public key method. In HDMI, HDCP authentication is executed by performing communication via an HDMI cable. As a result, for example, when the external device cannot authenticate a video control apparatus, it denies transmission of video and audio data to that video control apparatus.

Japanese Patent Laid-Open No. 2007-78980 describes a technique associated with a DDC communication. The DDC communication initiates when the video control apparatus side switches an HDMI HPD (Hot Plug Detect) signal from OFF to ON. According to Japanese Patent Laid-Open No. 2007-78980, when the formats of video and audio data transmitted from the external device side according to this DDC communication are different from those set on the video control apparatus side, the video control apparatus side switches the HPD signal from OFF to ON again, thus performing the DDC communication again. As a result, an external device can be prevented from being held in a state in which no video and audio data are output in a case where a DDC communication is failure.

A case will be examined below wherein an input switching operation of a video control apparatus is performed using the CEC function in an environment in which a plurality of external devices are connected to one video control apparatus via HDMI. In this case, upon performing the input switching operation by the CEC function, the video control apparatus has to transmit EDID to the respective external devices, and generate physical addresses of the respective external devices in advance. For this purpose, the video control apparatus has to incorporate EDID ROMs, each storing EDID information at respective HDMI ports.

On the other hand, the video control apparatus holds authentication information required for HDCP authentication in an HDCP ROM. This authentication information is required to perform authentication for decrypting encrypted video and audio data transmitted from each external device to the video control apparatus. For this reason, the video control apparatus need only have as many HDCP ROMs as the number of HDMI ports that can be simultaneously displayed on one screen.

That is, the EDID ROMs should be equipped in correspondence with respective HDMI ports, but the number of the HDCP ROMs can be smaller than the number of HDMI ports of the video control apparatus.

In this way, when the number of EDID ROMs is smaller than that of HDCP ROMs, if a DDC communication is made between the external device and the video control apparatus, the external device can access the EDID ROM but it often cannot access the HDCP ROM. In this case, the external device cannot obtain any response to an access request to the HDCP ROM, and the state of a DDC line becomes indefinite. When the video control apparatus makes the input switching operation in an indefinite state of the DDC line, a DDC access does not resume to a normal state, and display of video data and output of audio data may often be disabled.

For example, when the external device selected by the input switching operation cannot access the HDCP ROM and cannot authenticate the video control apparatus by the HDCP, transmission of video and audio data to the external device are denied external device. Also, for example, the external device may often not resume to a normal state from the response waiting state of an access to the HDCP ROM.

In Japanese Patent Laid-Open No. 2007-78980 described above, a receiver monitors video and audio data to be received, and checks if video and audio data in formats supported by the receiver are received. If it is determined that video and audio data in formats which are not supported by the receiver are received, the receiver recognizes the data as abnormal. Upon recognition of reception of the abnormal data, an HPD signal is switched to OFF and is then switched to ON again, thus initiating a DDC access again.

However, according to the technique disclosed in Japanese Patent Laid-Open No. 2007-78980, a circuit that monitors video and audio data is required, thus posing a problem. Also, in Japanese Patent Laid-Open No. 2007-78980, in order to check if received video and audio data are abnormal data, format detection of these received data is required. For this reason, a predetermined period of time is required until it is recognized that the received video and audio data are abnormal data, thus posing another problem.

SUMMARY OF THE INVENTION

The present invention provides a video control apparatus which can stably make an input switching operation from a plurality of devices which require authentication processing, and a control method thereof.

According to one aspect of the present invention, there is provided a video control apparatus comprising: a plurality of connection units adapted to connect external devices, each of the plurality of connection units including a control signal line used to notify the connected external device to initiate communication initialization processing; a selection unit adapted to select one of the plurality of connection units as an input source of at least one of video data and audio data; a storage unit adapted to store authentication information required for a communication made by the external device to output at least one of the video data and the audio data, the storage unit being accessible from the external device connected to the selected connection unit; a notification unit adapted to notify the external device connected to the selected connection unit to initiate the communication initialization processing including an access from the external device to the storage unit via the control signal line included in the selected connection unit; and a control unit adapted to control the notification by the notification unit, wherein if the selected connection unit is changed, the control unit controls the notification unit to set an electric potential of the control signal line included in the newly selected connection unit at an OFF level for a predetermined period of time.

According to another aspect of the present invention, there is provided a method of controlling a video control apparatus, comprising: a selection step of selecting one of a plurality of connection unit for connecting external devices, each of the plurality of connection unit including a control signal line used to notify the external device to initiate communication initialization processing, as an input source of at least one of video data and audio data; a notification step of notifying the external device connected to the selected connection unit to initiate the communication initialization processing including an access from the external device to storage unit for storing authentication information required for a communication made by the external device to output at least one of the video data and the audio data, the storage unit being accessible from the selected external device via the control signal line included in the selected connection unit; and a control step of controlling the notification in the notification step, wherein if the selected connection unit is changed, the control step controls the notification step to set an electric potential of the control signal line included in the newly selected connection unit at an OFF level for a predetermined period of time, so as to notify the external device to initiate the communication initialization processing.

According to the present invention, an input switching operation from a plurality of devices that require authentication processing can be stably made.

Further features of the present invention will become apparent from the following description of exemplary embodiments with reference to the attached drawings.

BRIEF DESCRIPTION OF THE DRAWINGS

FIGS. 8A to 8I are timing charts for explaining an example of the processing according to the third embodiment of the present invention.

DESCRIPTION OF THE EMBODIMENTS

Figure 1:
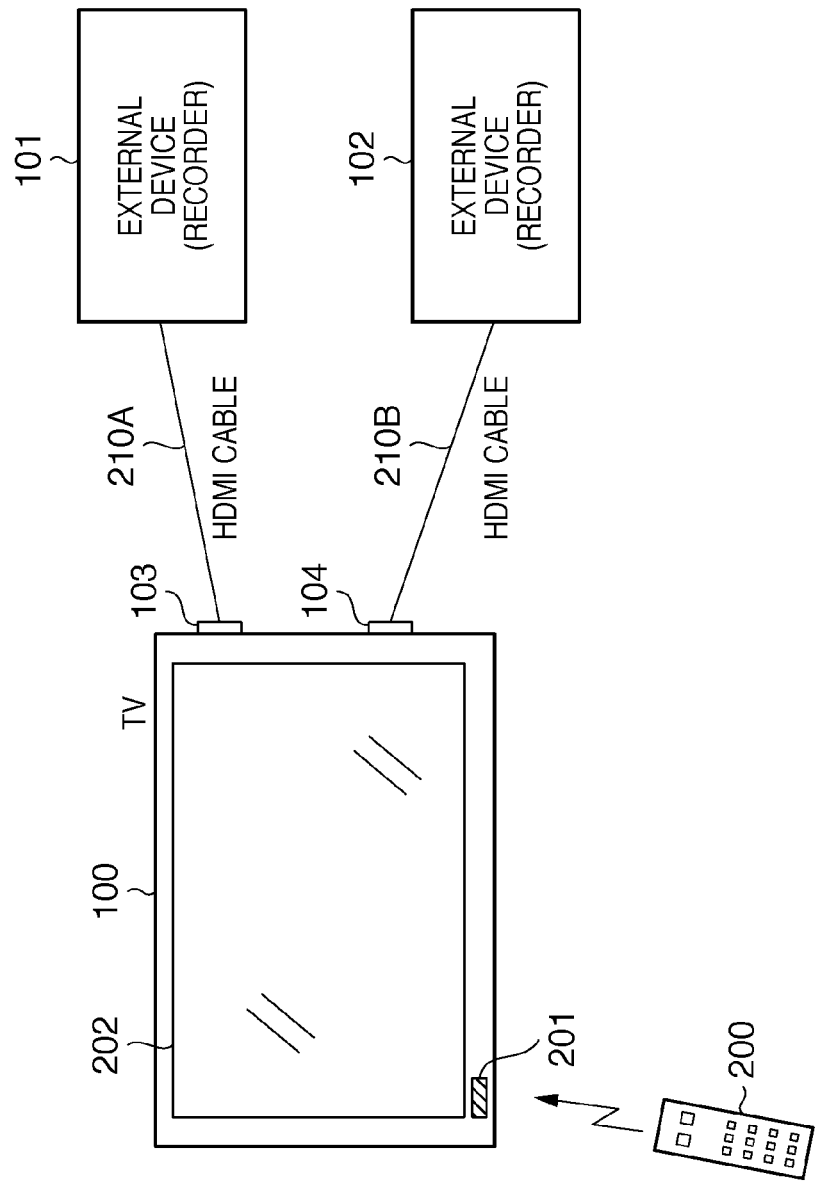
FIG. 1 is a schematic diagram showing an example of the system arrangement to which the present invention is applicable.

Preferred embodiments of the present invention will be described hereinafter with reference to the drawings. FIG. 1 schematically shows an example of the system arrangement to which the present invention is applicable. A television receiver 100 as a video control apparatus has a plurality of HDMI terminals. In the example of FIG. 1, the television receiver 100 has two HDMI ports 103 and 104, which can connect up to two HDMI-compatible external devices.

Assume that an external device 101 is connected to the HDMI port 103 via an HDMI cable 210A. Also, assume that an external device 102 is connected to the HDMI port 104 via an HDMI cable 210B. Assume that the external devices 101 and 102 are recorders which record and play back video and audio data using recording media such as a hard disk and optical disk.

The television receiver 100 allows remote control operations using a remote control command unit 200 (to be simply referred to as a remote control 200 hereinafter). For example, the remote control 200 modulates a control signal generated according to manipulation of an operation unit to an infrared ray signal, and transmits the infrared ray signal. This infrared ray signal is received by an infrared ray reception unit 201 of the television receiver 100, and is demodulated to restore the control signal. A control unit (not shown) of the television receiver 100 controls respective units of the television receiver 100 based on this control signal, and implements an operation according to the manipulation made on the remote control 200.

For example, the television receiver 100 can select one of the HDMI ports 103 and 104 as an external input terminal in accordance with manipulation of the remote control 200. A video based on video data output from a device connected to the selected HDMI port (assume that the external device 101 is connected) is displayed on a display unit 202 including, for example, an LCD (Liquid Crystal Display).

Assume that the user manipulates the remote control 200 to input a switching instruction of the external input terminal from the HDMI port 103 to the HDMI port 104. In response to this instruction, the control unit (not shown) controls a selector 107 (to be described later) to select the HDMI port 104. As a result, the device to be selected is switched from the external device 101 to the external device 102. Then, a display on the display unit 202 is switched from a video based on the video data output from the external device 101 to that based on video data output from the external device 102.

The operation of a device connected to an HDMI port of the television receiver 100 can be controlled by the manipulation of the remote control 200. In the example of FIG. 1, the recording and playback operations and the like in the external device 101 or 102 can be controlled by manipulations on the remote control 200.

Figure 2:
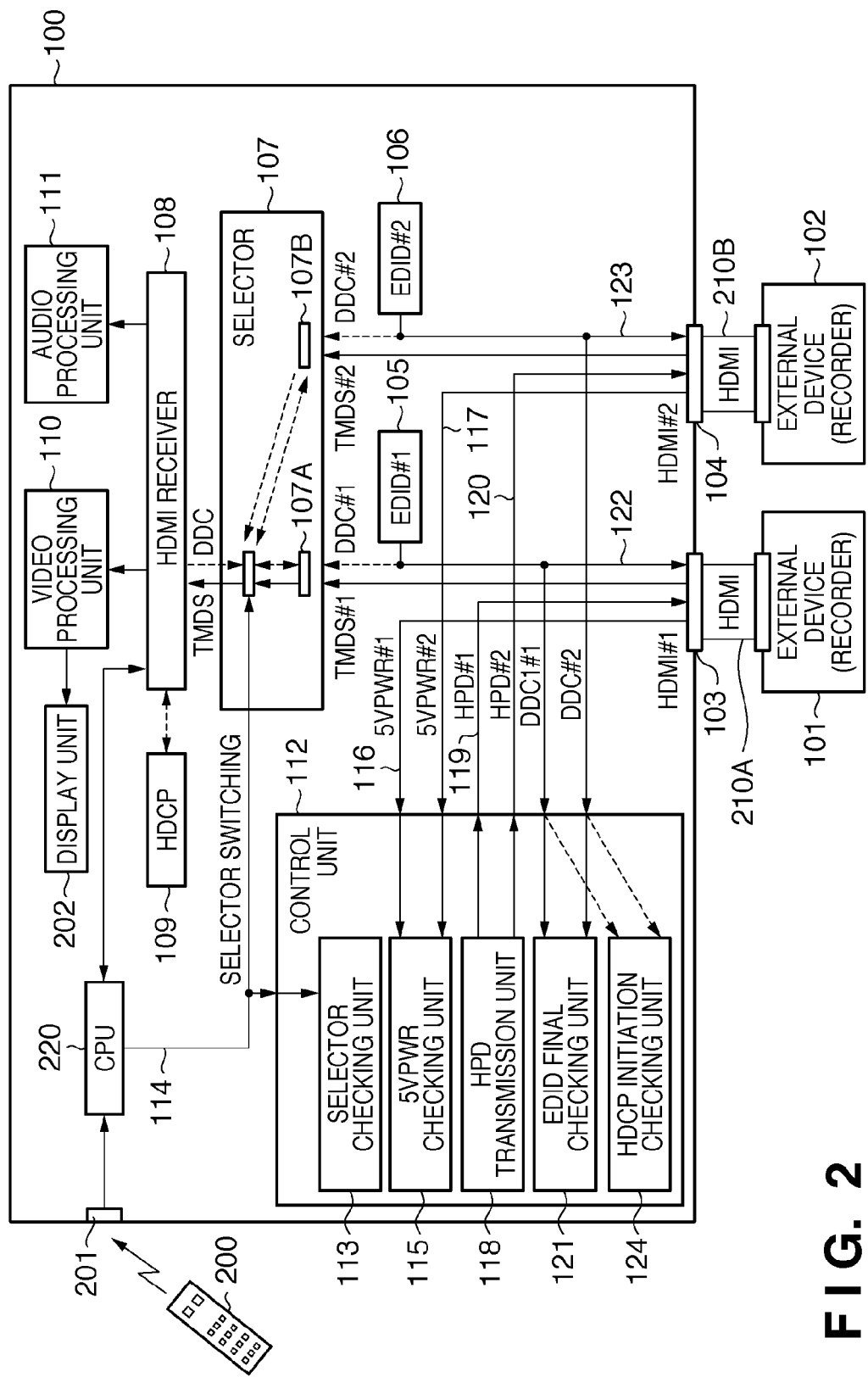
FIG. 2 is a block diagram showing an example of the arrangement of a television receiver to which the present invention is applicable.

FIG. 2 is a block diagram showing an example of the arrangement of the television receiver 100. A CPU 220 is connected to a ROM and RAM (neither are shown), and controls the overall operation of the television receiver 100 in accordance with programs stored in the ROM using the RAM as a work memory. For example, the CPU 220 generates and outputs various commands and control signals used to control the television receiver 100 based on control signals obtained by demodulating infrared ray signals which are transmitted from the remote control 200 in accordance with user's manipulations and are received by the infrared ray reception unit 201.

A selector 107 switches selection input terminals 107A and 107B in accordance with a selector switching signal 114 supplied from the CPU 220. As a result, the selector 107 selects one of the HDMI ports 103 and 104 as an input source of video and audio data. For example, the CPU 220 generates a selector switching signal 114 in accordance with user manipulation of the remote control 200. This selector switching signal 114 is supplied to the selector 107 and also to a control unit 112.

An HDMI receiver 108 receives signal input from one of the HDMI ports 103 and 104, which is selected by the selector 107. Of the signals received by the HDMI receiver 108, video data is supplied to a video processing unit 110 to undergo predetermined signal processing, and the processed video data is displayed on, for example, the display unit 202. Likewise, of the signals received by the HDMI receiver 108, audio data is supplied to an audio processing unit 111 to undergo predetermined signal processing, and the processed audio data is output as audio by an acoustic device such as a loudspeaker (not shown).

The HDMI ports 103 and 104 respectively have TMDS lines #1 and #2, 5V power lines 116 and 117, and DDC lines 122 and 123. Also, the HDMI ports 103 and 104 respectively have HPD lines 119 and 120 as control signal lines. Although not shown, the HDMI ports 103 and 104 further have CEC lines used to exchange CEC commands required to coordinate the television receiver 100 and external devices 101 and 102.

The control unit 112 has a selector checking unit 113, 5V power (5VPWR) checking unit 115, HPD transmission unit 118, EDID final checking unit 121, and HDCP initiation checking unit 124. These checking units and transmission unit in the control unit 112 are controlled by programs stored in advance in a ROM (not shown) by a CPU (not shown).

The TMDS lines #1 and #2 are those used to transmit video, audio, and auxiliary data from the external devices 101 and 102 to the television receiver 100. The DDC lines 122 and 123 are those used to exchange EDID and HDCP authentication information between the television receiver 100 and external devices 101 and 102. That is, the DDC lines 122 and 123 are commonly used by transmission of the EDID and exchange of the HDCP authentication information.

The TMDS line #1 and DDC line 122 extending from the HDMI port 103 are connected to the selection input terminal 107A of the selector 107. An EDID ROM 105 (EDID#1) is connected to the DDC line 122, which is also connected to the control unit 112. The DDC line 122 connected to the control unit 112 branches inside the control unit 112 and the branched lines are respectively connected to the EDID final checking unit 121 and HDCP initiation checking unit 124.

Likewise, the TMDS line #2 and DDC line 123 extending from the HDMI port 104 are connected to the selection input terminal 107B of the selector 107. An EDID ROM 106 (EDID#2) is connected to the DDC line 123, which is also connected to the control unit 112. As shown in FIG. 2, the DDC line 123 branches inside the control unit 112 and the branched lines are respectively connected to the EDID final checking unit 121 and HDCP initiation checking unit 124.

The EDID final checking unit 121 detects EDID access final data from EDID transmitted via the DDC lines 122 and 123. The HDCP initiation checking unit 124 detects HDCP access initiation data (called a key selection vector) supplied via the DDC lines 122 and 123.

The EDID ROMs 105 and 106 are rewritable nonvolatile memories. The EDID ROMs 105 and 106 store various kinds of information associated with the television receiver 100 such as display performance, address information of the HDMI ports such as physical addresses, and the like. The EDID ROMs 105 and 106 store individual physical addresses for the respective HDMI ports 103 and 104. For example, the EDID ROM 105 stores a physical address [1.0.0.0], and the EDID ROM 106 stores a physical address [2.0.0.0].

The 5V power lines 116 and 117 extending from the HDMI ports 103 and 104 are connected to the 5V power checking unit 115 in the control unit 112. The 5V power lines 116 and 117 are those used to request a DDC access from the external devices 101 and 102 to the television receiver 100.

The HPD lines 119 and 120 extending from the HDMI ports 103 and 104 are connected to the HPD transmission unit 118 in the control unit 112. The HPD lines 119 and 120 are those used to allow the television receiver 100 to notify the external devices 101 and 102 of completion of preparation for a DDC access. The HPD transmission unit 118 sets the electric potentials of the HPD lines 119 and 120 to one of a High state of a high voltage (ON level) and a Low state of a low voltage (OFF level). The High state indicates that preparation for a DDC access at the corresponding HDMI port is complete, and the DDC access is set in an ON state. If the HPD lines 119 and 120 are in the Low state, the DDC access is set in an OFF state. According to HDMI, the High state falls within a voltage range from 2.4 V to 5.3 V, and the Low state falls within a voltage range from 0 V to 0.4 V.

An HDCP ROM 109 is connected to the HDMI receiver 108. The HDCP ROM 109 stores authentication information required for HDCP authentication. Of the external devices 101 and 102, the device connected to the HDMI port selected by the selector 107 can access the HDCP ROM 109. Of the external devices 101 and 102, the external device which has accessed the HDCP ROM 109 and the television receiver 100 execute HDCP authentication processing. When the authentication processing has succeeded, the HDMI receiver 108 decrypts encrypted video and audio data supplied from the selector 107.

In the control unit 112, the selector checking unit 113 checks based on the selector switching signal 114 supplied from the CPU 220 to which of the selection input terminals 107A and 107B the input in the selector 107 is switched. Based on this checking result, the control unit 112 can detect which of the HDMI ports 103 and 104 is selected by the selector 107.

First Embodiment

Figure 3:
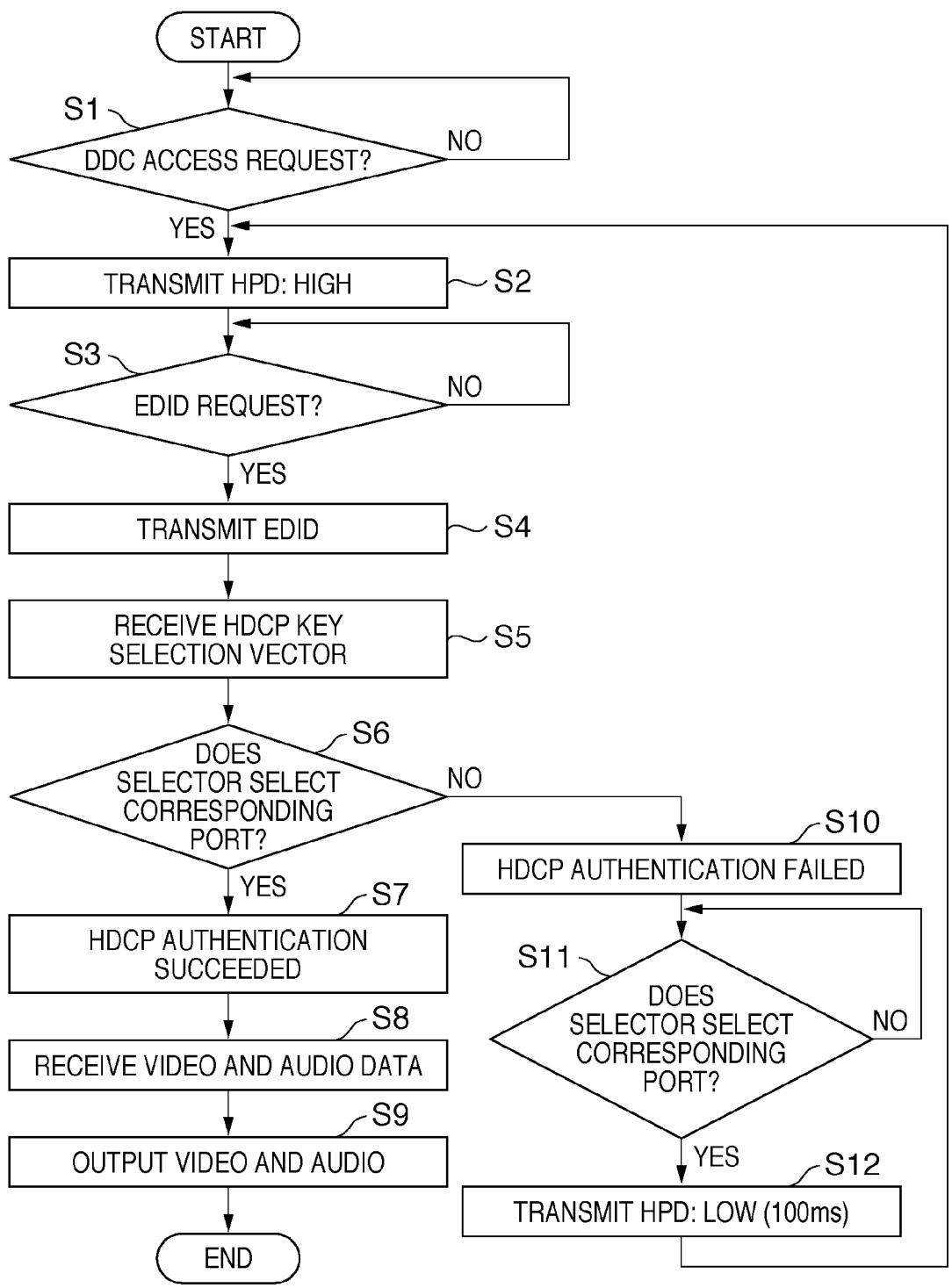
FIG. 3 is a flowchart showing an example of processing according to the first embodiment of the present invention.

Processing according to the first embodiment of the present invention will be described below with reference to the flowchart shown in FIG. 3, the timing charts shown in FIGS. 4A to 4I, and the aforementioned block diagram shown in FIG. 2. FIG. 3 is a flowchart showing an example of the processing according to the first embodiment of the present invention. A case will be exemplified below wherein the external device 102 of the external device 101 connected to the HDMI port 103 and the external device 102 connected to the HDMI port 104 is selected. Of course, the same applies to the processing to be described below if the external device 102 is replaced by the external device 101.

In step S1, the control unit 112 waits for a DDC access request from the external device 102. In the control unit 112, the 5V power checking unit 115 checks the presence/absence of a DDC access request based on the voltage value of the 5V power line 117 extending from the HDMI port 104 to which the external device 102 is connected. If it is determined that the DDC access request from the external device 102 is detected, the process advances to step S2.

In step S2, the HPD transmission unit 118 transmits an HPD signal in a High state onto the HPD line 120 to notify the external device 102 that the DDC access is ON. This signal notifies the external device 102 to initiate communication initialization processing.

In step S3, the control unit 112 waits for an EDID request from the external device 102. If a slave address and read command are supplied from the external device 102 to the EDID ROM 106 via the DDC line 123, the EDID is read out from the EDID ROM 106, and is transmitted to the external device 102 (step S4). This EDID is received by the external device 102.

If it is determined that reception of the EDID is complete, the external device 102 transmits a key selection vector to the television receiver 100 via the DDC line 123. If this key selection vector is received by the television receiver 100, it is supplied to the HDCP initiation checking unit 124 in the control unit 112 (step S5). Note that the key selection vector is a command indicating HDCP access initiation.

Note that the external device 102 generates its own physical address based on the physical address of the HDMI port 104 stored in the received EDID. The generated physical address is transmitted from the external device 102 to the television receiver 100 at a predetermined timing (e.g., that between the processes in steps S4 and S5) using a CEC command. This physical address is temporarily written in an internal memory of the CPU 220. The television receiver 100 can control the external device 102 by means of CEC commands using the physical address of the external device 102.

If the key selection vector is received by the HDCP initiation checking unit 124, the process advances to step S6. The selector checking unit 113 checks in step S6 which of the selection input terminals 107A and 107B is selected by the selector 107. The selector checking unit 113 attains this checking process based on, for example, the voltage value of the selector switching signal 114 or a serial communication made with the selector 107. Then, the selector checking unit 113 detects the HDMI port selected by the selector 107 based on this checking result, and checks if the port corresponding to the external device 102 (the HDMI port 104 in this example) of the HDMI ports 103 and 104 is selected.

If it is detected in step S6 based on the checking result of the selector checking unit 113 that the selector 107 selects the HDMI port 104, HDCP authentication processing is executed. That is, the external device 102 accesses the HDCP ROM 109 connected to the HDMI receiver 108 via the DDC line 123 and the selection input terminal 107B of the selector 107. Then, the external device 102 reads out authentication information stored in the HDCP ROM 109 via the DDC line 123, and authenticates the television receiver 100.

If the HDCP authentication has succeeded (step S7), it is determined that the communication initialization processing ends, and the process advances to step S8. If the HDCP authentication has succeeded in step S7, the external device 102 side outputs video and audio data, and transmits them to the television receiver 100 via the HDMI cable 210B. In step S8, these video and audio data are received by the HDMI port 104 in the television receiver 100 (step S8), and are supplied to the HDMI receiver 108 via the selection input terminal 107B of the selector 107. The HDMI receiver 108 decrypts the supplied encrypted video and audio data, and supplies the video data to the video processing unit 110 and the audio data to the audio processing unit 111 (step S9).

On the other hand, if it is determined in step S6 that the selector 107 does not select the HDMI port 104, the process advances to step S10, and it is determined that the HDCP authentication has failed. That is, if the selector 107 selects the HDMI port 103, the external device 102 cannot access the HDCP ROM 109. For this reason, the external device 102 cannot authenticate the television receiver 100 using the HDCP, and the authentication fails.

In step S11, the control waits until the selector 107 selects the HDMI port 104 corresponding to the external device 102. For example, in step S11 the HDMI port selected by the selector 107 is detected based on the checking result of the selector checking unit 113. As a result, if it is determined that selection has been changed from the HDMI port 103 to the HDMI port 104, the process advances to step S12.

If the HDCP authentication has failed in step S10 since the external device 102 cannot access the HDCP ROM 109, the DDC line 123 is set in an indefinite state. In this case, even if the selector 107 selects the HDMI port 104 corresponding to the external device 102 later, the external device 102 is unlikely to transmit normal video and audio data.

For this reason, in the first embodiment, the HPD transmission unit 118 transmits an HPD signal in a Low state to the external device 102 for only a predetermined time period in step S12. The time period in which the HPD signal in the Low state is transmitted is that required for the external device 102 to recognize the Low state. According to the HDMI specification, this time period is 100 ms at minimum. In the first embodiment as well, the HPD signal in the Low state is transmitted for 100 msec in step S12. The transmission time period of the HPD signal in the Low state is 100 msec at minimum and 200 msec at maximum.

Upon completion of transmission of the HPD signal in step S12, the process returns to step S2, and the HPD transmission unit 118 transmits an HPD signal in a High state to the external device 102. This signal notifies the external device 102 of completion of access preparation again, the communication initialization processing is executed again, and the EDID request processing and HDCP authentication processing are executed.

Figure 4:
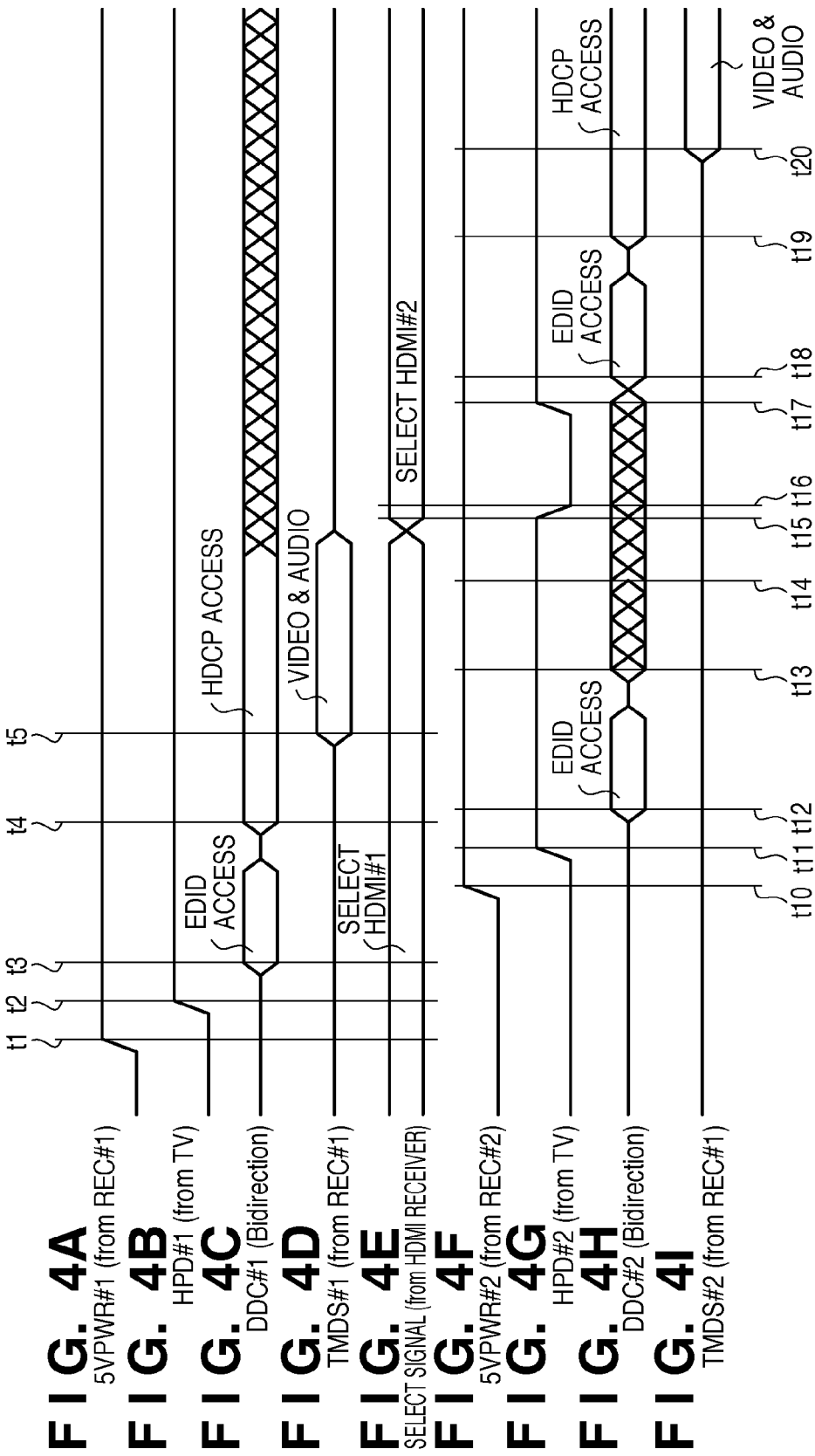
FIGS. 4A to 4I are timing charts for explaining an example of the processing according to the first embodiment of the present invention.

The processing according to the first embodiment will be described more practically using the timing charts of FIGS. 4A to 4I and with reference to the flowchart of FIG. 3 as needed. Of FIGS. 4A to 4I, FIGS. 4A to 4D show an example of the timings of various signals on the external device 101 side, that is, the HDMI port 103 side. FIGS. 4F to 4I show an example of the timings of various signals on the external device 102 side, that is, the HDMI port 104 side. Furthermore, FIG. 4E shows an example of the operation timings of the selector 107. In FIG. 4E, the HDMI ports 103 and 104 are respectively expressed by HDMI#1 and HDMI#2.

More specifically, FIGS. 4A and 4F show an example of voltage changes of the 5V power lines 116 and 117. FIGS. 4B and 4G show an example of voltage changes of the HPD lines 119 and 120. FIGS. 4C and 4H show an example of the DDC access states. FIGS. 4D and 4I show an example of video and audio data output from the selector 107.

For example, a case will be described below wherein the external device 101 is connected to the HDMI port 103, and the selector 107 selects the HDMI port 103 from the very beginning. In this case, upon, for example, activation of the external device 101, a predetermined voltage is applied to the 5V power line 116 (time t1 in FIGS. 4A to 4I). The 5V power checking unit 115 determines based on the voltage value on the 5V power line 116 that a DDC access request from the external device 101 is detected (step S1 in FIG. 3).

In response to the DDC access request, the HPD transmission unit 118 sets an HPD signal in a High state at time t2 (step S2 in FIG. 3). At time t3, the external device 101 transmits an access request to the EDID ROM 105 to the television receiver 100. EDID read out from the EDID ROM 105 in response to this access request is transmitted to the external device 101 at time t3 (steps S3 and S4 in FIG. 3). Upon completion of the read access of the EDID, the external device 101 transmits an HDCP key selection vector to the television receiver 100. This key selection vector is received by the HDCP initiation checking unit 124, and the HDCP authentication is attempted at time t4.

At time t4, the external device 101 is connected to the HDMI port 103, and the selector 107 selects the HDMI port 103, as exemplified in FIG. 4E (step S6 in FIG. 3). Therefore, the external device 101 can access the HDCP ROM 109, and the HDCP authentication has succeeded (step S7 in FIG. 3). As a result, the external device 101 outputs video and audio data to the television receiver 100 at time t5 (step S8 in FIG. 3).

As another example, a case will be described below wherein while the HDMI port 103 to which the external device 101 is connected is selected as an input as in the above example, the input is switched to the HDMI port 104 to which the external device 102 is connected.

For example, upon activation of the external device 102, when a predetermined voltage is applied to the 5V power line 117 (time t10 in FIGS. 4A to 4I), the 5V power checking unit 115 determines that a DDC access request from the external device 102 is detected (step S1 in FIG. 3).

In response to the DDC access request, an HPD signal is set in a High state at time t11 (step S2 in FIG. 3). After that, the external device 102 transmits an access request to the EDID ROM 106 to the television receiver 100. EDID read out from the EDID ROM 106 in response to this access request is transmitted to the external device 102 at time t12 (steps S3 and S4 in FIG. 3). Upon completion of read access of the EDID, the external device 102 transmits an HDCP key selection vector to the television receiver 100. This key selection vector is received by the HDCP initiation checking unit 124, and HDCP authentication is attempted at time t13.

As exemplified in FIG. 4E, the selector 107 selects the HDMI port 103 at time t13. For this reason, it is determined in step S6 in FIG. 3 that the selector 107 does not select the HDD port 104 corresponding to the external device 102, and the process advances to step S10 in FIG. 3 to determine that the HDCP authentication has failed (time t14). That is, at this time t14, the external device 102 can access the EDID ROM 106 but it cannot access the HDCP ROM 109, and the state of the DDC line 123 is indefinite.

After that, assume that the selector 107 selects the HDMI port 104 in accordance with, for example, user manipulation at time t15 (step S11 in FIG. 3). Then, at time t16, the HPD transmission unit 118 maintains an HPD signal on the HPD line 120 in a Low state for a period of, for example, 100 msec (step S12 in FIG. 3).

At time t17 after an elapse of 100 msec from time t16, the HPD transmission unit 118 transmits an HPD signal in a High state onto the HPD line 120 (step S2 in FIG. 3). In response to this HPD signal in the High state, the external device 102 transmits an EDID access request to the television receiver 100. In response to this request, EDID is transmitted from the television receiver 100 to the external device 102 (time t18; steps S3 and S4 in FIG. 3).

Furthermore, the external device 102 transmits a key selection vector, which is received by the television receiver 100 at time t19 (step S5 in FIG. 3). At time t19, as exemplified in FIG. 4E, the HDMI port selected by the selector 107 has already been changed from the HDMI port 103 to the HDMI port 104. For this reason, it is determined that the port corresponding to the external device 102 is selected (step S6 in FIG. 3), and it is determined at time t20 that the HDCP authentication has succeeded (step S7 in FIG. 3). If the HDCP authentication has succeeded, the external device 102 transmits video and audio data to the television receiver 100.

As described above, according to the first embodiment of the present invention, even in the DDC line indefinite state in which the external device can access the EDID ROM but it cannot access the HDCP ROM, the input switching operation can be stably attained. As a result, a problem that video and audio data from the external device cannot be displayed on the television receiver 100 can be solved, thus improving system reliability. When the input switching operation is executed in the DDC line indefinite state, video and audio data need not be monitored, and a time required from when the video and audio data are monitored until abnormality is detected can be shortened.

Second Embodiment

Figure 5:
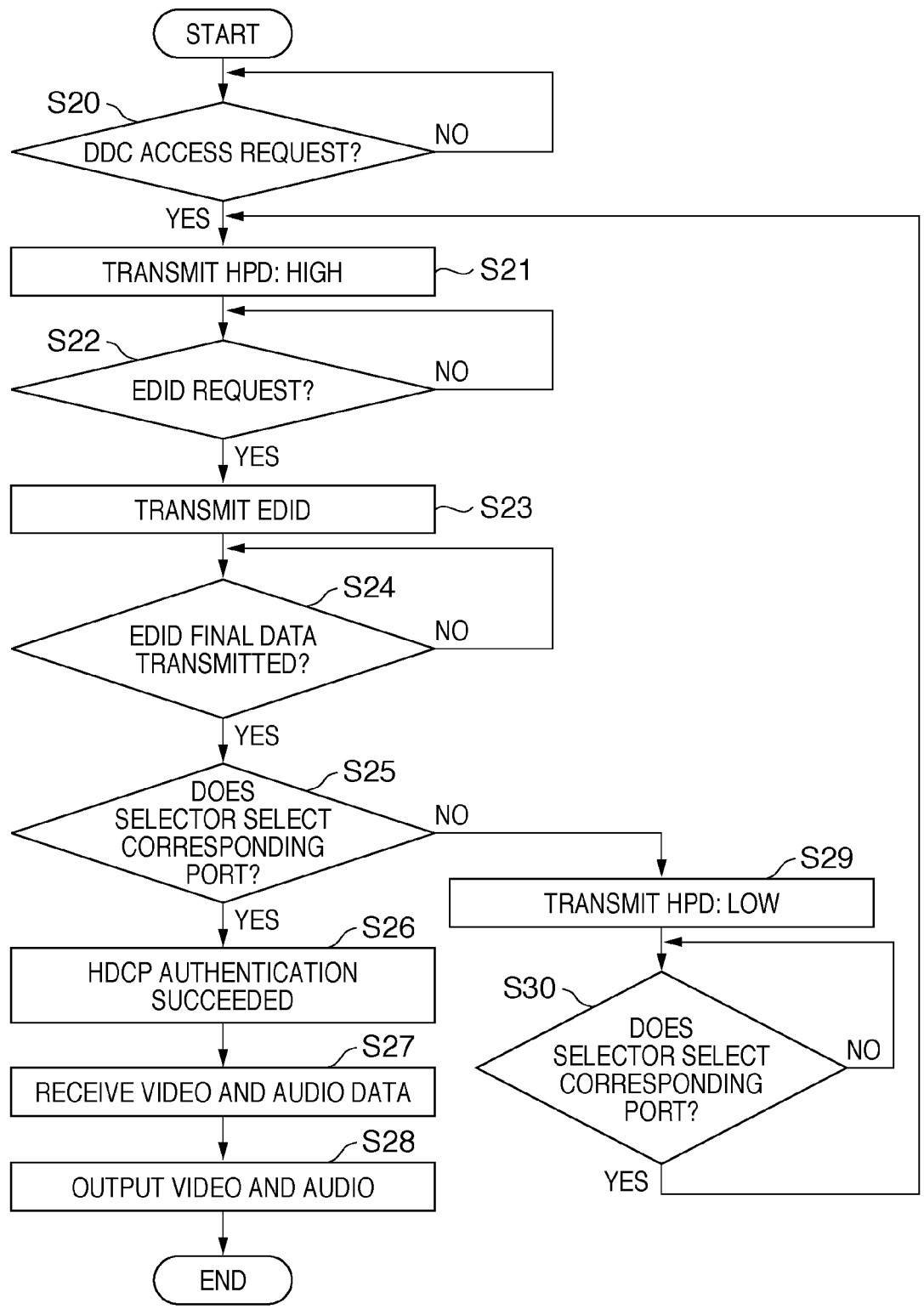
FIG. 5 is a flowchart showing an example of processing according to the second embodiment of the present invention.

Processing according to the second embodiment of the present invention will be described below with reference to the flowchart shown in FIG. 5, the timing charts shown in FIGS. 6A to 6I, and the aforementioned block diagram shown in FIG. 2. FIG. 5 is a flowchart showing an example of the processing according to the second embodiment of the present invention.

In the second embodiment, it is checked according to transmission of EDID final data to the external device if the selector 107 selects the HDMI port corresponding to that external device. If it is determined that the selector 107 does not select the corresponding HDMI port, an HPD signal in a Low state is transmitted to that external device, and the control waits until the selector 107 selects the corresponding HDMI port.

A case will be exemplified below wherein the external device 102 of the external device 101 connected to the HDMI port 103 and the external device 102 connected to the HDMI port 104 is selected. Of course, the same applies to the processing to be described below if the external device 102 is replaced by the external device 101.

Note that in the following description of the second embodiment, a description of parts common to the first embodiment described above will not be given as needed.

In step S20, the control unit 112 waits for a DDC access request from the external device 102. If it is determined that the DDC access request from the external device 102 is detected, the process advances to step S21. In step S21, the HPD transmission unit 118 transmits an HPD signal in a High state onto the HPD line 120 to notify the external device 102 that the DDC access is ON.

In step S22, the control unit 112 waits for an EDID request from the external device 102. If a slave address and read command are supplied from the external device 102 to the EDID ROM 106 via the DDC line 123, the EDID is read out from the EDID ROM 106, and is transmitted to the external device 102 (step S23).

The control unit 112 checks in step S24 if EDID final data is transmitted. That is, the EDID final checking unit 121 in the control unit 112 monitors the DDC line 123 to check if the transmitted EDID is its final data. For example, if data transmitted on the DDC line 123 is the 256-th byte data in the EDID, the EDID final checking unit 121 determines that the final data is transmitted. If the EDID final checking unit 121 determines that the final data is transmitted, the process advances to step S25.

The selector checking unit 113 checks in step S25 if the selector 107 selects the port corresponding to the external device 102 (the HDMI port 104 in this example) of the HDMI ports 103 and 104. Based on the checking result, the HDMI port selected by the selector 107 is detected. As a result, if it is determined that the selector 107 selects the HDMI port 104 corresponding to the external device 102, HDCP authentication processing is executed.

That is, the external device 102 accesses the HDCP ROM 109 connected to the HDMI receiver 108 via the DDC line 123 and the selection input terminal 107B of the selector 107. Then, the external device 102 reads out authentication information stored in the HDCP ROM 109 via the DDC line 123, and authenticates the television receiver 100.

If the HDCP authentication has succeeded (step S26), the external device 102 outputs video and audio data. These video and audio data are received by the television receiver 100 (step S27). In the television receiver 100, these video and audio data are received by the HDMI port 104, and are supplied to the HDMI receiver 108 via the selection input terminal 107B of the selector 107. The HDMI receiver 108 decrypts the supplied encrypted video and audio data, and supplies the video data to the video processing unit 110 and the audio data to the audio processing unit 111 (step S28).

On the other hand, if it is determined in step S25 above that the selector 107 does not select the HDMI port 104 corresponding to the external device 102, the process advances to step S29. In step S29, the HPD transmission unit 118 transmits an HPD signal in a Low state to the external device 102. After that, the process advances to step S30, and the control waits until the selector 107 selects the HDMI port 104 corresponding to the external device 102.

For example, if the control unit 112 detects in step S30 based on the checking result of the selector checking unit 113 if the selector 107 has changed selection from the HDMI port 103 to the HDMI port 104, the process returns to step S21. Then, the HPD transmission unit 118 switches the HPD signal transmitted to the external device 102 from the Low state to a High state. As a result, this signal notifies the external device 102 of completion of DDC access preparation again, and the EDID request processing and HDCP authentication processing are executed again.

Figure 6:
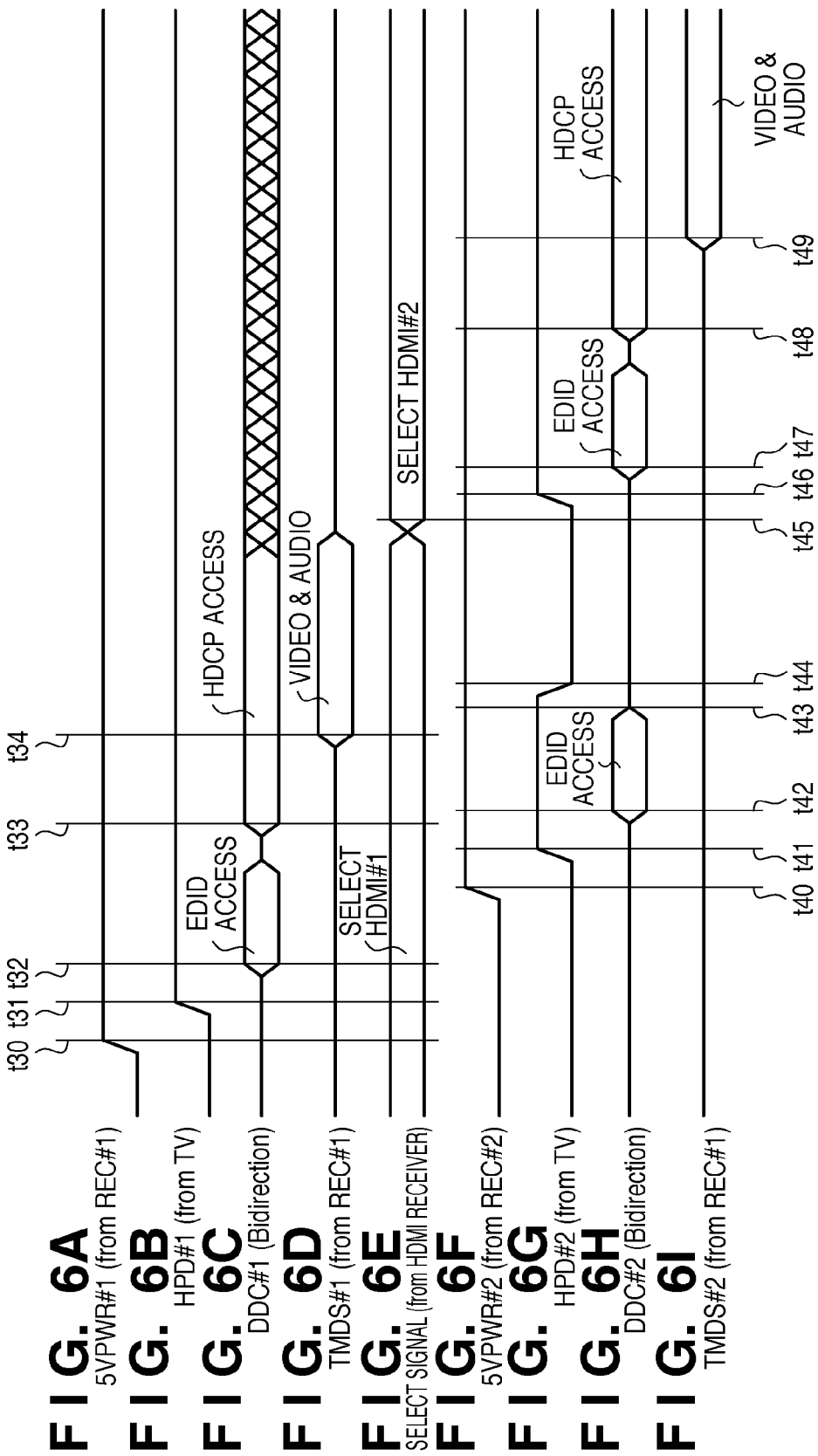
FIGS. 6A to 6I are timing charts for explaining an example of the processing according to the second embodiment of the present invention.

The processing according to the second embodiment will be described more practically using the timing charts of FIGS. 6A to 6I and with reference to the flowchart of FIG. 5 as needed. Of FIGS. 6A to 6I, FIGS. 6A to 6D show an example of the timings of various signals on the external device 101 side, that is, the HDMI port 103 side, as in FIGS. 4A to 4D above. FIGS. 6F to 6I show an example of the timings of various signals on the external device 102 side, that is, the HDMI port 104 side, as in FIGS. 4F to 4I above. Furthermore, FIG. 6E shows an example of the operation timings of the selector 107 as in FIG. 4E above.

For example, a case will be described below wherein the external device 101 is connected to the HDMI port 103, and the selector 107 selects the HDMI port 103 from the very beginning. In this case, upon, for example, activation of the external device 101, a predetermined voltage is applied to the 5V power line 116 (time t30 in FIGS. 6A to 6I). The 5V power checking unit 115 determines based on the voltage value on the 5V power line 116 that a DDC access request from the external device 101 is detected (step S20 in FIG. 5).

In response to the DDC access request, the HPD transmission unit 118 sets an HPD signal in a High state at time t31 (step S21 in FIG. 5). After that, the external device 101 transmits an access request to the EDID ROM 105 to the television receiver 100. EDID read out from the EDID ROM 105 in response to this access request is transmitted to the external device 101 at time t32 (steps S22 and S23 in FIG. 5).

If the EDID final checking unit 121 determines that the final data of the EDID is transmitted (step S24 in FIG. 5), the process advances to step S25. In step S25, the HDMI port selected by the selector 107 is detected based on the checking result of the selector checking unit 113 to check if the selector 107 selects the HDMI port 103 corresponding to the external device 101.

In this example, the external device 101 is connected to the HDMI port 103, and the selector 107 selects the HDMI port 103 corresponding to the external device 101, as exemplified in FIG. 6E. For this reason, the external device 101 can access the HDCP ROM 109 (time t33), and the HDCP authentication has succeeded (step S26 in FIG. 5). As a result, the external device 101 outputs video and audio data to the television receiver 100 at time t34 (step S27 in FIG. 5).

As another example, a case will be described below wherein while the HDMI port 103 to which the external device 101 is connected is selected as an input as in the above example, the input is switched to the HDMI port 104 to which the external device 102 is connected.

For example, upon activation of the external device 102, when a predetermined voltage is applied to the 5V power line 117 (time t40 in FIGS. 6A to 6I), the 5V power checking unit 115 determines that a DDC access request from the external device 102 is detected (step S20 in FIG. 5).

In response to the DDC access request, the HPD transmission unit 118 sets an HPD signal in a High state at time t41 (step S21 in FIG. 5). After that, the external device 102 transmits an access request to the EDID ROM 106 to the television receiver 100. EDID read out from the EDID ROM 106 in response to this access request is transmitted to the external device 102 at time t42 (steps S22 and S23 in FIG. 5).

If the EDID final checking unit 121 determines that the final data of the EDID is transmitted (time t43), it is detected if the selector 107 selects the HDMI port 104 corresponding to the external device 102. As exemplified in FIG. 6E, the HDMI port 103 is selected at time t43, and it is determined that the HDMI port 104 corresponding to the external device 102 is not selected.

In this case, according to the process in step S29 in FIG. 5, the HPD transmission unit 118 transmits an HPD signal in a Low state at time t44. Then, the control waits until the selector 107 selects the HDMI port 104 corresponding to the external device 102. For example, if it is detected at, for instance, time t45 that the selector 107 selects the HDMI port 104 corresponding to the external device 102, the process returns to step S21 in FIG. 5. Then, the HPD transmission unit 118 transmits an HPD signal in a High state to the external device 102 (time t46). This signal notifies the external device 102 of completion of DDC access preparation again, the communication initialization processing is executed again, and the EDID request processing (time t47) and HDCP authentication processing (time t48) are executed. If the HDCP authentication has succeeded, the external device 102 transmits video and audio data (time t49).

As described above, according to the second embodiment, a time period in a DDC line indefinite state in which the external device can access the EDID ROM but it cannot access the HDCP ROM can be shortened. Therefore, when the selector 107 executes the input switching operation, video and audio data output from the external device can be displayed on the television receiver 100 after a shorter time period than in the aforementioned first embodiment.

Third Embodiment

Figure 7:
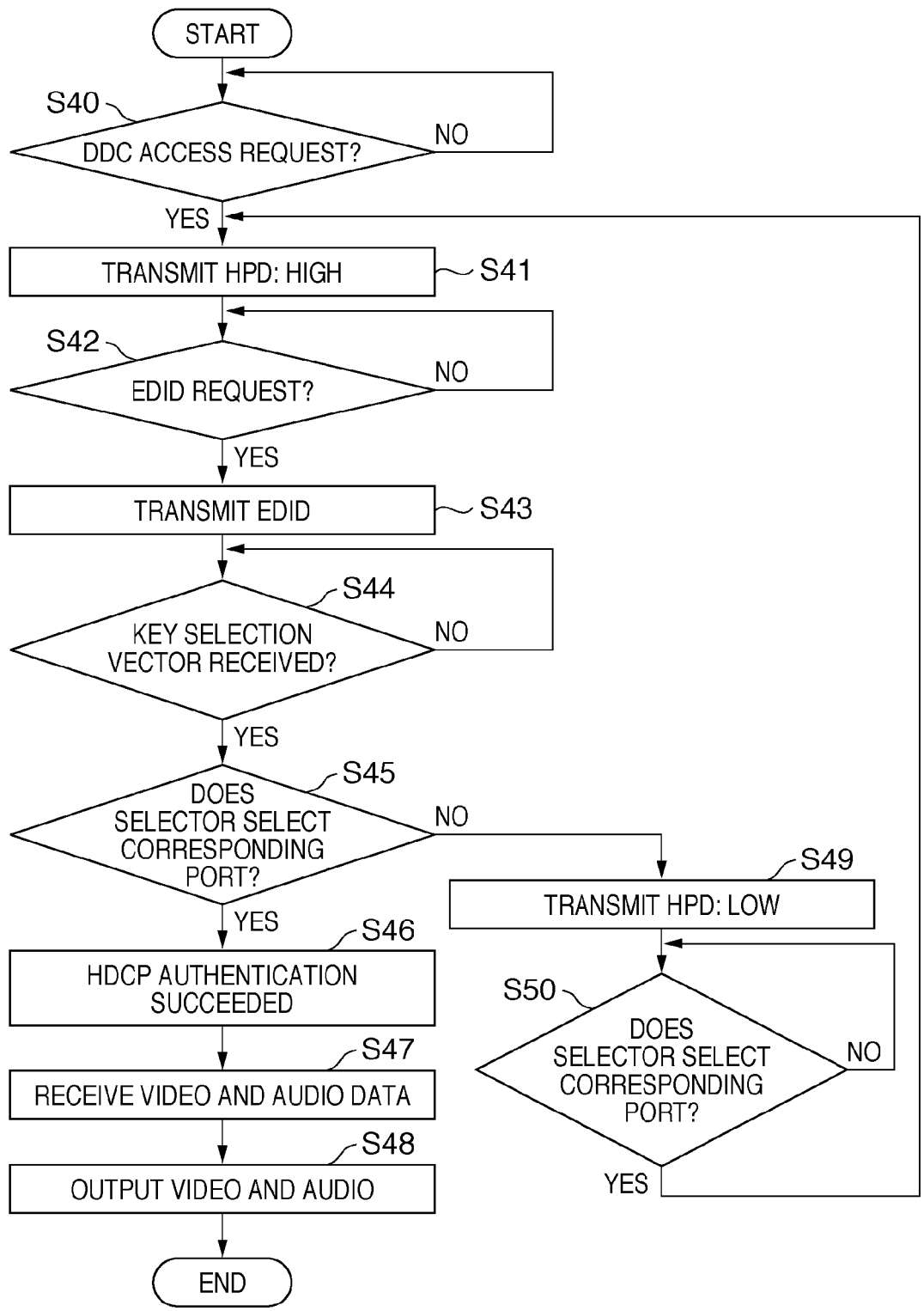
FIG. 7 is a flowchart showing an example of processing according to the third embodiment of the present invention.

Processing according to the third embodiment of the present invention will be described below with reference to the flowchart shown in FIG. 7, the timing charts shown in FIGS. 8A to 8I, and the aforementioned block diagram shown in FIG. 2. FIG. 7 is a flowchart showing an example of the processing according to the third embodiment of the present invention.

In the third embodiment, it is checked according to reception of a key selection vector from the external device if the selector 107 selects the HDMI port corresponding to that external device. If it is determined that the selector 107 does not select the corresponding HDMI port, an HPD signal in a Low state is transmitted to that external device, and the control waits until the selector 107 selects the corresponding HDMI port.

A case will be exemplified below wherein the external device 102 of the external device 101 connected to the HDMI port 103 and the external device 102 connected to the HDMI port 104 is selected. Of course, the same applies to the processing to be described below if the external device 102 is replaced by the external device 101.

Note that in the following description of the third embodiment, a redundant description of parts common to the first and second embodiments described above will not be given.

If the control unit 112 determines that a DDC access request from the external device 102 is detected (step S40), the process advances to step S41. In step S41, the HPD transmission unit 118 transmits an HPD signal in a High state onto the HPD line 120. In response to an EDID request from the external device 102 (step S42), the EDID is read out from the EDID ROM 106, and is transmitted to the external device 102 (step S43).

The control unit 112 checks in step S44 if a key selection vector is received via the DDC line 123. That is, upon completion of reception of the EDID, the external device 102 transmits the key selection vector to the television receiver 100 so as to initiate HDCP authentication. In the television receiver 100, the HDCP initiation checking unit 124 in the control unit 112 monitors the DDC line 123 to detect the key selection vector transmitted via the DDC line 123. If the HDCP initiation checking unit 124 determines that the key selection vector is received via the DDC line 123, the control unit 112 advances the process to step S45.

It is checked in step S45 based on the checking result of the selector checking unit 113 if the selector 107 selects the HDMI port corresponding to the external device 102 (the HDMI port 104 in this example) of the HDMI ports 103 and 104. If it is determined that the selector 107 selects the HDMI port 104 corresponding to the external device 102, HDCP authentication processing is executed.

If the HDCP authentication has succeeded (step S46), the external device 102 outputs video and audio data. These video and audio data are received by the HDMI port 104 of the television receiver 100 (step S47), and are supplied to the HDMI receiver 108 via the selection input terminal 107B of the selector 107. The HDMI receiver 108 decrypts the supplied encrypted video and audio data, and supplies the video data to the video processing unit 110 and the audio data to the audio processing unit 111 (step S48).

On the other hand, if it is determined in step S45 above that the selector 107 does not select the HDMI port 104 corresponding to the external device 102, the process advances to step S49. In step S49, the HPD transmission unit 118 transmits an HPD signal in a Low state to the external device 102. After that, the process advances to step S50, and the control waits until the selector 107 selects the HDMI port 104 corresponding to the external device 102.

For example, if the control unit 112 detects in step S50 based on the checking result of the selector checking unit 113 if the selector 107 has changed selection from the HDMI port 103 to the HDMI port 104, the process returns to step S41. Then, the HPD transmission unit 118 switches the HPD signal transmitted to the external device 102 from the Low state to a High state. As a result, this signal notifies the external device 102 of completion of DDC access preparation again, and the EDID request processing and HDCP authentication processing are executed again.

The processing according to the third embodiment will be described more practically using the timing charts of FIGS. 8A to 8I and with reference to the flowchart of FIG. 7 as needed. Of FIGS. 8A to 8I, FIGS. 8A to 8D show an example of the timings of various signals on the external device 101 side, that is, the HDMI port 103 side, as in FIGS. 4A to 4D above. FIGS. 8F to 8I show an example of the timings of various signals on the external device 102 side, that is, the HDMI port 104 side, as in FIGS. 4F to 4I above. Furthermore, FIG. 8E shows an example of the operation timings of the selector 107 as in FIG. 4E above.

For example, a case will be described below wherein the external device 101 is connected to the HDMI port 103, and the selector 107 selects the HDMI port 103 from the very beginning. In this case, upon, for example, activation of the external device 101, a predetermined voltage is applied to the 5V power line 116 (time t60 in FIGS. 8A to 8I). The 5V power checking unit 115 determines based on the voltage value on the 5V power line 116 that a DDC access request from the external device 101 is detected (step S40 in FIG. 7).

In response to the DDC access request, the HPD transmission unit 118 sets an HPD signal in a High state at time t61 (step S41 in FIG. 7). After that, the external device 101 transmits an access request to the EDID ROM 105 to the television receiver 100. EDID read out from the EDID ROM 105 in response to this access request is transmitted to the external device 101 at time t62 (steps S42 and S43 in FIG. 7).

Upon completion of the EDID read access, the external device 101 transmits an HDCP key selection vector to the television receiver 100. This key selection vector is received by the HDCP initiation checking unit 124 at time t63.

If it is determined that the HDCP initiation checking unit 124 receives the key selection vector from the external device 101 (step S44 in FIG. 7), the process advances to step S45 in FIG. 7. Then, the selector checking unit 113 checks if the selector 107 selects the HDMI port 103 corresponding to the external device 101. In this example, the external device 101 is connected to the HDMI port 103, and the selector 107 selects the HDMI port 103, as exemplified in FIG. 8E. For this reason, the external device 101 can access the HDCP ROM 109. As a result, the HDCP authentication has succeeded (step S46 in FIG. 7), and the external device 101 outputs video and audio data to the television receiver 100 at time t64 (step S47 in FIG. 7).

As another example, a case will be described below wherein while the HDMI port 103 to which the external device 101 is connected is selected as an input as in the above example, the input is switched to the HDMI port 104 to which the external device 102 is connected.

For example, upon activation of the external device 102, when a predetermined voltage is applied to the 5V power line 117 (time t70 in FIGS. 8A to 8I), the 5V power checking unit 115 determines that a DDC access request from the external device 102 is detected (step S40 in FIG. 7).

In response to the DDC access request, an HPD signal is set in a High state at time t71 (step S41 in FIG. 7). After that, the external device 102 transmits an access request to the EDID ROM 106 to the television receiver 100. EDID read out from the EDID ROM 106 in response to this access request is transmitted to the external device 102 at time t72 (steps S42 and S43 in FIG. 7).

Upon completion of the EDID read access, the external device 102 transmits a key selection vector to the television receiver 100 and attempts to execute HDCP authentication. The key selection vector is received by the television receiver 100 at time t73 (step S44 in FIG. 7). In the television receiver 100, upon reception of the key selection vector, the selector checking unit 113 checks if the selector 107 selects the HDMI port 104 corresponding to the external device 102 (step S45 in FIG. 7). In the example of FIGS. 8A to 8I, the HDMI port 103 is selected at time t73, and it is determined that the port corresponding to the external device 102 is not selected.

In this case, according to the process in step S49 in FIG. 7, the HPD transmission unit 118 transmits an HPD signal in a Low state at time t74. In response to this signal, the external device 102 stops the DDC access. Then, the control waits until the selector 107 selects the HDMI port 104 corresponding to the external device 102. For example, if it is detected at, for instance, time t75 based on the checking result of the selector checking unit 113 that the selector 107 selects the HDMI port 104 corresponding to the external device 102, the process returns to step S41 in FIG. 7. Then, the HPD transmission unit 118 switches the HPD signal to be transmitted to the external device 102 from the Low state to a High state (time t76).

This signal notifies the external device 102 of completion of DDC access preparation again, and the EDID request processing (time t77) and HDCP authentication processing (time t78) are executed again. If the HDCP authentication has succeeded, the external device 102 transmits video and audio data (time t79).

As described above, according to the third embodiment, a time period in a DDC line indefinite state in which the external device can access the EDID ROM but it cannot access the HDCP ROM can be shortened. Therefore, when the selector 107 executes the input switching operation, video and audio data output from the external device can be displayed on the television receiver 100 after a shorter time period than in the aforementioned first embodiment.

In the above description, in the television receiver 100, either one of the two HDMI ports 103 and 104 is selected. However, the present invention is not limited to this specific example. That is, the present invention is applicable to a case in which a plurality of HDMI ports smaller than the total number of HDMI ports are selected from three or more HDMI ports. For example, the present invention can also be applied to a case in which two out of four HDMI ports are selected, and video data for two frames received by the selected HDMI ports are simultaneously displayed on one screen by, for example, a picture-in-picture mode.

Other Embodiments

The aforementioned embodiments can be implemented by software using a computer (or a CPU or MPU) of a system or apparatus.

Therefore, a computer program itself to be supplied to the computer to make the computer implement the aforementioned embodiments implements the present invention. That is, the computer program itself required to implement the functions of the aforementioned embodiments is one form of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-096558, filed Apr. 2, 2008, which is hereby incorporated by reference herein in its entirety.

What is claimed is:

1. A control apparatus comprising:
   a first unit that connects to a first device;
   a second unit that connects to a second device; and
   a control unit that (a) executes a first authentication process without executing a second authentication process if the first unit is selected and the second unit is not selected, (b) does not execute the second authentication process until the second unit is selected if the first unit is selected and the second unit is not selected, and (c) can control the first device by using an address relating to the first device after EDID (Extended Display Identification Data) is transmitted to the first device if the first unit is selected and the second unit is not selected, wherein the first authentication process is executed for receiving at least one of video data, audio data, and auxiliary data from the first device, and wherein the second authentication process is executed for receiving at least one of video data, audio data, and auxiliary data from the second device.

2. A method of controlling a control apparatus, wherein the control apparatus includes a first unit that connects to a first device, and a second unit that connects to a second device, the method comprising:
   executing a first authentication process without executing a second authentication process if the first unit is selected and the second unit is not selected;
   not executing the second authentication process until the second unit is selected if the first unit is selected and the second unit is not selected; and
   controlling the first device by using an address relating to the first device after EDID (Extended Display Identification Data) is transmitted to the first device if the first unit is selected and the second unit is not selected, wherein the first authentication process is executed for receiving at least one of video data, audio data, and auxiliary data from the first device, and wherein the second authentication process is executed for receiving at least one of video data, audio data, and auxiliary data from the second device.

3. A non-transitory computer-readable storage medium storing a program executed by a computer to perform a method for controlling a control apparatus, wherein the control apparatus includes a first unit that connects to a first device, and a second unit that connects to a second device, the method comprising:

executing a first authentication process without executing a second authentication process if the first unit is selected and the second unit is not selected;

not executing the second authentication process until the second unit is selected if the first unit is selected and the second unit is not selected; and controlling the first device by using an address relating to the first device after EDID (Extended Display Identification Data) is transmitted to the first device if the first unit is selected and the second unit is not selected, wherein the first authentication process is executed for receiving at least one of video data, audio data, and auxiliary data from the first device, and wherein the second authentication process is executed for receiving at least one of video data, audio data, and auxiliary data from the second device.

4. The control apparatus according to claim 1, wherein the first authentication process includes a process for authenticating, based on HDCP (High-bandwidth Digital Content Protection), between the control apparatus and the first device, and the second authentication process includes a process for authenticating, based on the HDCP, between the control apparatus and the second device.

5. The control apparatus according to claim 1, wherein the control unit performs a process for receiving at least one of video data, audio data, and auxiliary data from the first device after the first authentication process is executed if the first unit is selected and the second unit is not selected.

6. The control apparatus according to claim 1, wherein the control apparatus communicates with at least one of the first device and the second device by using HDMI (High-Definition Multimedia Interface).

7. The method according to claim 2, wherein the first authentication process includes a process for authenticating, based on HDCP (High-bandwidth Digital Content Protection), between the control apparatus and the first device, and the second authentication process includes a process for authenticating, based on the HDCP, between the control apparatus and the second device.

8. The method according to claim 2, further comprising: receiving at least one of video data, audio data, and auxiliary data from the first device after the first authentication process is executed if the first unit is selected and the second unit is not selected.

9. The method according to claim 2, wherein the control apparatus communicates with at least one of the first device and the second device by using HDMI (High-Definition Multimedia Interface).

10. The non-transitory computer-readable storage medium according to claim 3, wherein the first authentication process includes a process for authenticating, based on HDCP (High-bandwidth Digital Content Protection), between the control apparatus and the first device, and the second authentication process includes a process for authenticating, based on the HDCP, between the control apparatus and the second device.

11. The control apparatus according to claim 1, wherein the control unit can execute a process for controlling the first device by using a CEC (Consumer Electronics Control) command after the address relating to the first device is notified from the first device to the control apparatus if the first unit is selected and the second unit is not selected.

12. The control apparatus according to claim 1, wherein the first authentication process is not executed before the EDID is transmitted to the first device if the first unit is selected and the second unit is not selected.

13. The method according to claim 2, further comprising executing a process for controlling the first device by using a CEC (Consumer Electronics Control) command after the address relating to the first device is notified from the first device to the control apparatus if the first unit is selected and the second unit is not selected.

14. The method according to claim 2, wherein the first authentication process is not executed before the EDID is transmitted to the first device if the first unit is selected and the second unit is not selected.

\* \* \* \* \*